** 3,516,496
WELL COMPLETION AND WORKOVER FLUID
AND METHOD OF USE THEREOF**
James H. Barkman, Jr., Ventura, Calif., and Henry C. H.
Darley, Robert M. Jorda, and Robert N. Tuttle, Houston, Tex., assignors to Shell Oil Company, New York,
N.Y., a corporation of Delaware
No Drawing. Filed July 29, 1968, Ser. No. 748,166
Int. Cl. E21b *33/13*
U.S. Cl. 166—281 10 Claims

ABSTRACT OF THE DISCLOSURE

An improved well completion and workover fluid comprising an aqueous solution containing a synergistic additive mixture of a polyoxyethylene polymer and powdered marble particles of 1–400 micron dimensions and optimally a wetting and bulk reducing agent. The above composition is injected into a permeable subsurface earth formation, e.g., during drilling, well completion or before oil recovery by fluid drive, to temporarily plug desired portions thereof by means of an impermeable filter cake. The filter cake is removed by backflowing and/or dissolving the solid particles with a pH-adjusting fluid which is displaced into contact with the portion of the formation in which the filter cake was formed.

BACKGROUND OF THE INVENTION

The present invention relates to a new and novel well completion and workover fluid for use in situations in which temporary plugging of a permeable subsurface earth formation is required which on subsequent treatment is readily removed without causing formation damage or swelling of clayey portions of the formation, or decreasing its susceptibility to consolidation treatment, or decreasing the permeability of the treated formation or its susceptibility to a fluid drive for oil recovery.

Proposed completion and workover fluids comprise oil-water emulsions or aqueous systems containing water- or oil-soluble solids which are readily dissoluble in aqueous acidic or oil solvent solutions. Emulsion systems proposed in patents such as U.S. Pats. 2,898,294 or 3,007,865 and aqueous solutions are described in U.S. Pats. 3,000,818; 3,272,741; 3,353,600 or 3,353,604. Generally with systems as described in these patents, it has been found that they are difficult to handle, it requires a long time before their effectiveness is noted in respect to a restoration of permeability making them economically costly to use, they adversely effect the permeability of formations, they tend to plug perforations and portions of the formations and they are difficult to remove without causing damage to the formation and borehole on acid treatment.

SUMMARY OF THE INVENTION

It has now been discovered that the above undesirable properties of conventional well completion and workover fluids can be obviated and an improved fluid obtained which is capable of temporarily plugging desired portions of a formation and fractures and which is readily removed by a number of suitable means, e.g., backflow or by acidization or subsequent waterflooding or the like which comprise treating a permeable subsurface earth formation so as to temporarily plug desired or selective portions thereof by:

(1) Adding while mixing into an aqueous liquid enough polyoxyethylene to provide a selected type of rheological property and enough solid particles of calcium carbonate or powdered marble of 1 to 400 micron dimensions to provide a selected degree of filter-loss control so as to form a relatively stable single-liquid-phase suspension;

(2) Plugging, with a filter cake formed by the additives suspended in aqueous liquid (1), a portion of the earth formation by pressure control such that the liquid pressure in the suspension exceeds that in the formation; and, (3) Subsequently restoring the permeability of the earth formation by removing the filter cake formed by step (2) by any suitable means such as, for example, by contacting the portion of formation that was contacted by the suspension with a fluid that adjust the pH of the aqueous liquid around the solid particles to one at which the particles are soluble.

Formations thus treated can be effectively consolidated by use of resinous materials, e.g., epoxy resins as described in U.S. Pats. 3,339,633; 3,368,625 and 3,368,626 and/or subjected to a drive fluid to effectively recover oil from such treated formations. The drive fluids can contain surfactants, thickeners and mixtures thereof.

The present invention specifically differs from prior processes in respect to forming an impermeable filter cake that remains impermeable until it is removed by backflowing and/or a dissolution of the solid particles by the displacement of a pH-adjusting fluid into contact with the portion of the formation on which a filter cake was formed. Also, the steps of depositing the filter cake from an aqueous solution in which the rheological properties are adjusted by a polyoxyethylene and then applying the pH adjustment, provides a combination which is uniquely new, novel and effective in restoring substantially the full natural permeability of the treated portion of the earth formation.

Thus, in fracturing operations, this invention accomplishes the result of U.S. Pat. 3,353,604, on injecting aqueous liquid containing dispersed, slowly dissolving particles of a solid, water-soluble polymer which is subsequently dissolved as more aqueous liquid is injected. The present process differs in the use of bridging particles that become soluble only after a change in the pH of the aqueous liquid.

Also, the present invention accomplishes the results of U.S. Pat. 3,353,600 on injecting a suspension of similarly dissolvable solid particles in an oil-in-water emulsion which breaks after a selected exposure to the earth-formation temperature and provides a partial restoration of permeability that can be augmented by adjusting the pH of the aqueous liquid to one at which the particles are soluble. The present process differs from the patented process in using a single-liquid-phase suspension of solid particles of a bridging size range that yields a filter cake which remains impermeable for as long as desired. The patented process has the disadvantage that if the treatment requiring the temporary plugging of the earth formation is delayed, for example, by an equipment failure, the plug is destroyed before the treatment can be completed.

Also by the process of the present invention further improvement can be accomplished by addition to the aqueous solution containing polyethylene oxide polymer and the micro-particles of calcium carbonate a small amount of wetting agent, and particularly a polyphosphate such as sodium hexametaphosphate.

In step (1) of the present process, the types and amounts of the polyoxyethylene which can be used are described in Canadian Pat. 698,933 or U.S. Pats. 3,079,337 and 3,116,791. For well-completion fluids, a viscosity in the order of several-hundred centipoises is generally desirable in order to ensure an adequate entrainment of sand and the like particles which it may be desirable to circulate out of the well bore. For temporarily plugging the walls of the fracture, a somewhat lower concentration can be used in order to enhance the friction-reducing effects of the polyoxyethylene.

These polymers are water-soluble and result in high viscosity when added to fresh water or brine even in quantities of 0.5 percent by weight or less. They do not cause reduction in permeability of sandstone in the 0.04 to 2 darcy range. This non-damaging character of polyethylene oxide polymers, e.g., "Polyox," makes them especially promising for use in completion fluids where well bore damage must be avoided. Small amounts of such polymers will also act to reduce friction in turbulent flow, and so it may be useful in hydraulic fracturing treatments of tight formations with water.

Other materials such as guar gums or hydroxyethyl cellulose cause substantial, permanent permeability reduction. On the other hand cores flooded with polyethylene oxide polymers can be completely restored to initial permeability by forward flow of brine only, and neither acid nor backflow is required.

DESCRIPTION OF PREFERRED EMBODIMENTS OF THE INVENTION

As illustrative examples two Polyox polymers were investigated, the "WSR-301" and the "coagulant" grades which have molecular weights of $4 \times 10^6$ and $8 \times 10^6$, respectively, described in the Union Carbide Bulletin entitled "Polyox, Water-Soluble Resins." The structure of Polyox is:

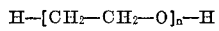

$$H-[CH_2-CH_2-O]_n-H$$

wherein $n \approx 100{,}000$. Solutions were prepared by dissolving the polymer in 5% sodium chloride brine with gentle stirring. Finally, any lumpy material was strained out with a fine mesh screen. The cores used were Cypress standstone of about 2 darcy permeability. After initial permeability to brine was established the cores were flooded with about 30 pore volumes of the polymer solution. The core was then flooded with brine to determine the final permeability. All experiments were at room temperature.

A solution of 0.3% WSR-301 Polyox in brine has an apparent viscosity while flowing in the core of about 280 cp. As the polymer solution was pushed out of the core with clean brine, 71% of the initial permeability was quickly recovered. The core was allowed to sit undisturbed for several hours after which 100% permeability was regained. This sequence was repeated two more times with the same result. Apparently about four hours are required to regain 100% initial permeability depending on the flow rate and perhaps other factors.

A solution of 0.3% of the Polyox coagulant has an apparent viscosity while flowing in the core of 1170 cp. After about four hours and the same brine volume as before, 58% of the initial permeability was regained. The core was shut-in overnight after which 100% permeability was regained. It appears that somewhat longer time is required to regain permeability than with the WSR-301 Polyox.

Return permeability tests using the filter cake cell have been run with combinations of Polyox and finely divided calcium carbonate. After acidization to remove the calcium carbonate, 100% of the initial permeability was restored.

The present suspensions can advantageously contain additional components, such as sodium hexametaphosphate and/or sodium chloride and/or other electrolytes. The present process is unique in that it can utilize even a relatively silty water, such as a bay water, and still provide a restoration of substantially all of the natural permeability of the treated earth formation.

The subsequently dissolvable particles of bridging size range can comprise acid-soluble or base-soluble materials of the type described in U.S. Pat. 3,353,600. The size range of such particles is preferably in the order of 1 to 400 microns and correlated with the sizes of the pores and the properties of the polyoxyethylene.

Equipment and techniques of the type used in conventional well-completion or fracturing operations can be used to displace the suspension into contact with the portion of the earth formation to be temporarily plugged. In well-completion operations, this involves circulating the suspension into the borehole so that it displaces the fluid that was previously present and becomes spotted adjacent to the earth formation under a hydrostatic and/or pump-applied pressure providing a downhole pressure in the borehole fluid that exceeds the formation fluid pressure. The suspension of the present invention can advantageously be used as the drilling fluid which is circulated during the drilling into the interval into which the well is to be completed. In fracturing operations, the suspension is simply injected into the fractures being formed or extended at a pressure sufficient to force fluid into the earth formation.

The filter cake can be removed by suitable means such as by use of any acidic or basic or gaseous or liquid fluids. These fluids can be backflowed from the portion of the formation that was contacted by the suspension prior to contacting such portions with a pH-adjusting fluid. However, although such a backflowing removes at least the bulk of the filter cake and restores a signifiicant portion of permeability, a substantially complete restoration of the natural permeability necessitates the contacting of the temporarily plugged portion of the earth formation with the pH-adjusting fluid.

FURTHER DESCRIPTION OF PREFERRED EMBODIMENTS OF THE INVENTION

Aqueous solutions of a nonionic polymer polyoxyethylene and finely divided calcium carbonate (referred to below as "Polychalk") have been found to possess very favorable properties for use as workover or completion fluids as well as for use in hydraulic fracturing. The filter cake formed from "Polychalk" can be removed by a small amount of acid or by reverse flow, and the filtrate is non-damaging to a wide variety of core types ranging from 4 md. limestone to 2400 md. sandstone. "Polychalk" has been found to produce a significant improvement over similar chalk systems that contain hydroxyethyl cellulose, carboxymethyl cellulose, partially hydrolyzed polyacrylamide, guar gum or the like materials to control the rheological properties of the system.

Flooding with brine solutions of various polymers (no calcium carbonate present) were conducted on a wide variety of core materials in order to determine if residual damage resulted. After establishing the initial permeability to brine, the core was flooded with about 50 pore volumes of polymer such as "Polyox WSR-301" solution in 5 percent brine. Next the core was flooded with 5 percent brine to establish the final permeability in both directions. These results are summarized in Table 1, and it is apparent that polyoxyethylene polymer (Polyox WSR-301) is completely non-damaging to all the cores tested whereas hydroxyethyl cellulose is damaging although it is much better than guar gum. The removal of polyoxyethylene by brine flood is a time-dependent process requiring a 1 to 24-hour period, which varies with the concentration and throughput volume of polymer and the type of core material. The total volume of displacement brine does not appear to be important provided it is at least several pore volumes or more.

acid past the face, and the permeability to brine in the forward direction and finally the reverse direction was measured. The results are summarized in Table 2, and again 100 percent permeability was regained with the "Polychalk" system. The clean-up time was shorter than TABLE 1.—PERCENT OF ORIGINAL CORE PERMEABILITY REGAINED AFTER FLOODING WITH VARIOUS AQUEOUS POLYMER SOLUTIONS FOLLOWED BY BRINE

| Core type | Polymer solution (in 5% brine) | Percent of original permeability to brine [1] (forward) | Percent of original permeability to brine [1] (reverse) |
|---|---|---|---|
| 2,400 md. Cypress sand | 0.3% Polyox WSR-301 | 100 | 100 |
| 740 md. Cypress sand | do | 100 | 100 |
| 230 md. Berea sand | do | 100 | 100 |
| 4 md. Bedford lime | do | 100 | 100 |
| 740 md. Cypress sand | 0.4% HEC [2] | 15 | 43 |
| Do | 0.4% HEC plus acid | 76 | 92 |
| Do | 0.4% guar gum [3] | 1 | 25 |
| 230 md. Berea sand | 0.2% guar gum | 17 | 30 |
| 4 md. Bedford lime | 0.1% guar gum | 6 | 15 |
| 740 md. Cypress sand | 0.4% guar gum plus enzyme breaker | 10 | 54 |

[1] Permeability measured to 5% brine after resaturating core with brine for period ranging from 2 to 24 hours.
[2] HEC is hydroxyethyl cellulose.
[3] "Hi-Low Gel".

A series of experiments were made to simulate removal of the deposited filter cake material by hydrochloric acid while maintaining a pressure gradient in the forward direction. This would be the case in an unconsolidated reservoir just prior to consolidation as with epoxy resins where it is undesirable to backflow or produce the well. A filter cake was laid down on the core face under a differential pressure of 100 p.s.i. The filter cake was dissolved by circulating 15 percent hydrochloric acid past the face, and the permeability to brine in the case of the flooding experiments because the filtrate volume which invaded the core was small. The results for hydroxyethyl cellulose and guar gum are included for comparison.

TABLE 2.—PERCENT OF ORIGINAL CORE PERMEABILITY REGAINED AFTER DISSOLVING FILTER CAKE WITH HYDROCHLORIC ACID

| Core type | Composition of completion fluid [1] | Percent of original permeability (forward) [1] | Percent of original permeability (reverse) [1] |
|---|---|---|---|
| 2,400 md. Cypress sand | 3 lb./bbl. Polyox WSR-301 / 3 lb./bbl. reg. sluggit [2] | 100 | 100 |
| Do | 1.5 lb./bbl. Polyox coagulant / 3 lb./bbl. reg. sluggit | 100 | 100 |
| 230 md. Berea sand | 3 lb./bbl. Polyox WSR-301 / 10 lb./bbl. micro sluggit [2] | 100 | 100 |
| 740 md. Cypress sand | 1.5 lb./bbl. hydroxyethyl cellulose / 1.5 lb./bbl. reg. sluggit | 63 | 96 |
| Do | 3 lb./bbl. guar gum / 3 lb./bbl. reg. sluggit | 9 | 52 |

[1] Permeability measured to 5% brine.
[2] "Regular sluggit" is calcium carbonate with maximum and mean particle diameter of 420μ and 60μ. "Micro sluggit" is 35μ and 3.2μ. Sluggit is equivalent to "Polychalk".

Still another series of experiments were made to measure and return permeability after the "Polychalk" filter cake was removed by reverse flow. These results are given in Table 3, and again 100 percent permeability is restored with each core and each "Polychalk" system.

TABLE 3.—PERCENT OF ORIGINAL CORE PERMEABILITY REGAINED AFTER FILTER CAKE IS REMOVED BY REVERSE FLOW

| Core Type | Composition of completion fluid | Percent of original permeability to reverse flow of brine |
|---|---|---|
| 2,400 md. Cypress sand | 3 lb./bbl. Polyox WSR-301 / 3 lb./bbl. reg. sluggit | 100 |
| Do | 1.5 lb./bbl. Polyox coagulant / 10 lb./bbl. micro sluggit | 100 |
| 230 md. Berea sand | 3 lb./bbl. Polyox WSR-301 / 10 lb./bbl. micro sluggit | 100 |
| 4 md. Bedford lime | 3 lb./bbl. Polyox WSR-301 / 10 lb./bbl. micro sluggit | 100 |

Additional test data on systems of the present invention are given in Table 4.

TABLE 4.—PROPERTIES OF BRINE SOLUTIONS OF POLYMERS AND FINELY DIVIDED CALCIUM CARBONATE

| Fluid system (in 5% brine) | API filter loss | Static filter rate on 2,400 md. Cypress sandstone | Plastic vis. (Fann),[1] cp. | Yield point (Fann)[1] |
|---|---|---|---|---|
| 1 lb./bbl. Polyox WSR-301 | 300 ml./30 minutes | | 11 | 13 lb./100 ft.[2] |
| 3 lb./bbl. Polyox WSR-301 | 86 ml./30 minutes | | 55 | 40 lb./100 ft.[2] |
| 3 lb./bbl. Polyox WSR-301<br>3 lb./bbl. regular sluggit | 85 ml./30 minutes | 0.07 cc./cm.²/min./100 p.s.i. | | |
| 3 lb./bbl. Polyox WSR-301<br>3 lb./bbl. micro sluggit | 58 ml./30 minutes | | 55 | Do. |
| 3 lb./bbl. Polyox WSR-301<br>10 lb./bbl. micro sluggit | 14 ml./30 minutes | 0.02 cc./cm.²/min./100 p.s.i. | | |
| 1 lb./bbl. Polyox coagulant | 60 ml./30 minutes | | 30 | 20 lb./100 ft.[2] |
| 1.5 lb./bbl. Polyox coagulant | 67 ml./30 minutes | | 35 | 30 lb./100 ft.[2] |
| 1.5 lb./bbl. Polyox coagulant<br>3 lb./bbl. regular sluggit | 48 ml./30 minutes | 0.05 cc./cm.²/min./100 p.s.i. | | |
| 1.5 lb./bbl. Polyox coagulant<br>3 lb./bbl. micro sluggit | 13 ml./30 minutes | | 30 | 40 lb./100 ft.[2] |
| 1.5 lb./bbl. Polyox coagulant<br>10 lb./bbl. micro sluggit | do | 0.02 cc./cm.²/min./100 p.s.i. | | |

[1] Assuming behavior that of an ideal Bingham plastic with two data taken at rates of shear approximately equal to 480 and 960 sec.⁻¹.

Polyoxyethylene solutions are stable up to the boiling point of water, where they precipitate. The viscosity is relatively insensitive to sodium chloride concentration, and sufficiently viscous solutions can be prepared for any ordinary oil field brine. The viscosity is not significantly reduced nor is the polymer degraded by hydrochloric acid. Solutions of polyoxyethylene degrade with a loss of viscosity when exposed to high rates of shear, but this should present no problems in workover and completion operations where high pumping rates are not employed.

The foregoing description of the invention is merely intended to be explanatory thereof. Various changes in the details of the described method may be made, within the scope of the appended claims, without departing from the spirit of the invention.

We claim as our invention:

1. An improved completion and workover composition capable of temporarily plugging an underground earth formation without decreasing its permeability on being subjected to subsequent unplugging treatment, said temporary plugging composition consisting essentially of a single-phase aqueous liquid suspension containing sufficient polyethyleneoxide polymer having a molecular weight of at least 100,000 to provide selected rheological properties and sufficient solid particles of calcium carbonate or powdered marble of bridging size range to provide a selected degree of filter-loss control.

2. A suspension of claim 1 wherein the polymeric compound is a water-soluble polyoxyethylene polymer in the molecular weight range of from about $4 \times 10^6$ to about $8 \times 10^6$ and the particle size of the calcium carbonate is between 1 and 400 microns.

3. A suspension of claim 1 containing a small amount of polyphosphate wetting agent.

4. A suspension of claim 3 containing a small amount of alkali metal polyphosphate.

5. A suspension of claim 1 wherein the aqueous liquid is a water solution containing a polyoxyethylene polymer in the molecular weight range of from about $4 \times 10^6$ to about $8 \times 10^6$ as a thickening agent, powdered marble of 1 to 400 microns and sodium hexametaphosphate.

6. A suspension of claim 1 wherein the aqueous liquid is a brine solution containing a polyoxyethylene polymer in the molecular weight range of from about $4 \times 10^6$ to about $8 \times 10^6$ as a thickening agent, powdered marble of 1 to 400 microns and sodium hexametaphosphate.

7. A method for the temporary plugging of an underground formation penetrated by the borehole of a well with a completion or workover composition comprising:
   (a) injecting an aqueous liquid containing a polyethyleneoxide polymer having a molecular weight of at least 100,000 and solid particles of calcium carbonate or powdered marble in the size range of 1 to 400 microns into the borehole and into contact with the underground formation;
   (b) maintaining said suspension in contact with a permeable portion of the formation until a filter cake is formed capable of plugging the formation; and,
   (c) restoring subsequently the permeability of the formation by dissolving the filter cake.

8. A method of claim 7 wherein the suspension in step (a) contains a polyphosphate wetting agent.

9. A method of claim 7 wherein the aqueous liquid of step (a) is a water solution containing polyoxyethylene polymer to increase the water viscosity, the solid particles are calcium carbonate of 1 to 400 micron size and the aqueous liquid contains sodium hexametaphosphate.

10. A method of claim 9 wherein the restoration of permeability of the formation is accomplished by acidization.

References Cited

UNITED STATES PATENTS

| 3,018,826 | 1/1962 | Sandiford | 166—275 X |
| 3,116,791 | 1/1964 | Sandiford et al. | 166—274 |
| 3,351,079 | 11/1964 | Gibson | 252—8.55 |
| 3,353,600 | 11/1967 | Annis et al. | 166—252 X |
| 3,431,976 | 3/1969 | Harvey et al. | 166—274 |

STEPHEN J. NOVOSAD, Primary Examiner

U.S. Cl. X.R.

166—295